United States Patent
Yang

(10) Patent No.: US 9,696,811 B2
(45) Date of Patent: Jul. 4, 2017

(54) ELECTRONIC APPARATUS AND METHOD

(71) Applicant: Lenovo (Beijing) Co., Ltd., Haidian District, Beijing (CN)

(72) Inventor: Guang Yang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 75 days.

(21) Appl. No.: 14/182,693

(22) Filed: Feb. 18, 2014

(65) Prior Publication Data

US 2014/0240221 A1     Aug. 28, 2014

(30) Foreign Application Priority Data

Feb. 22, 2013  (CN) .......................... 2013 1 0057420

(51) Int. Cl.
*G06F 3/01*     (2006.01)
*G06F 1/16*     (2006.01)

(52) U.S. Cl.
CPC .............. *G06F 3/017* (2013.01); *G06F 1/163* (2013.01)

(58) Field of Classification Search
None
See application file for complete search history.

(56) References Cited

U.S. PATENT DOCUMENTS

| 7,030,861 B1* | 4/2006 | Westerman ......... G06F 3/04883 |
| | | 345/173 |
| 2006/0028429 A1* | 2/2006 | Kanevsky et al. ............ 345/156 |
| 2009/0326406 A1* | 12/2009 | Tan et al. ....................... 600/546 |
| 2012/0147200 A1* | 6/2012 | Watanabe .............. H04N 7/181 |
| | | 348/207.11 |
| 2014/0063054 A1* | 3/2014 | Osterhout et al. ............ 345/633 |

FOREIGN PATENT DOCUMENTS

| CN | 102591451 A | 7/2012 |
| CN | 102609093 A | 7/2012 |
| CN | 102906623 A | 2/2013 |
| CN | 102915111 A | 2/2013 |

OTHER PUBLICATIONS

First Office Action dated Sep. 2, 2016 out of Chinese Priority Application No. 201310057420.9 (12 pages including English translation).

* cited by examiner

*Primary Examiner* — Nicholas Lee
*Assistant Examiner* — Duane N Taylor, Jr.
(74) *Attorney, Agent, or Firm* — Brinks Gilson & Lione; G. Peter Nichols

(57) ABSTRACT

An electronic apparatus and a method are disclosed. The electronic apparatus can be worn on a wrist of a user and can have established a data connection to a remote apparatus. The electronic apparatus includes a first image collecting unit for collecting an image; a storing unit for storing image collected by the first image collecting unit; a gesture detecting unit for detecting a gesture of the user; a data transmitting unit for transmitting data with the remote apparatus; a control unit for activating the first image collecting unit when it is determined that a first gesture of the user is detected; and activating the data transmitting unit to transmit the image stored in the storing unit to the remote apparatus when it is determined that a second gesture of the user is detected.

12 Claims, 2 Drawing Sheets and transmits information for indicating a result of confirmation back to the electronic apparatus, The control unit determines that the first gesture or the second gesture of the user is detected only when information of confirming the first gesture or the second gesture is received from the remote apparatus.

According to another aspect of the present invention, there provides an information processing method applied in an electronic apparatus which is worn on a wrist of a user and includes a first image collecting unit and establish a data connection to a remote apparatus, and the method includes the following steps:

detecting gesture of the user;

activating the first image collecting unit so as to collect image and store the image collected when it determines that a first gesture of the user is detected; and transmitting the image stored to the remote apparatus when it determines that a second gesture of the user is detected.

Preferably, in the method according to an embodiment of the present invention, when it determines that the first gesture of the user is not detected, the first image collecting unit is made to be in an off-status.

Preferably, in the method according to an embodiment of the present invention, the step of detecting the gesture of the user includes: detecting an electromyography signal of the wrist of the user so as to decide a current gesture of the user.

Preferably, in the method according to an embodiment of the present invention, the step of detecting the gesture of the user further includes: detecting movement information and angle information of the wrist of the user so as to assist to decide the current gesture of the user.

Preferably, in the method according to an embodiment of the present invention, the remote apparatus includes a second image collecting unit, and the hand of the user is in a field range of the second image collecting unit, and the step of detecting the gesture of the user further includes:

transmitting an instruction for turning on the second image collecting unit to the remote apparatus when the gesture detecting unit detects the first gesture or the second gesture, wherein, after receiving the instruction, the second image collecting unit acquires an image of the hand of the user to further confirm whether it is the first gesture or the second gesture and transmits information indicating result of confirmation back to the electronic apparatus; and determining that the first gesture or the second gesture of the user is detected only when information of confirming the first gesture or the second gesture is received from the remote apparatus.

In the electronic apparatus and the method according to an embodiment of the present invention, since the operation of image collection is triggered by detecting the first gesture of the user, and the operation of image transmission is triggered by detecting the second gesture of the user, the user's operations are more rapid and convenient as compared to the prior arts. Further, by using an assistant electromyography detecting sensor such as the acceleration sensor and the gyroscope or the like to carry out gesture detection, the accuracy of the detection can be increased. Further, by adding the second image collecting unit in the remote apparatus so as to assist the gesture detecting unit to detect the gesture, the accuracy of the detection can be further increased so as to avoid erroneous judgment.

ELECTRONIC APPARATUS AND METHOD

BACKGROUND

This application claims priority to Chinese patent application No. 201310057420.9 filed on Feb. 22, 2013, the entire contents of which are incorporated herein by reference.

The present invention relates to an electronic apparatus and a method, more specifically, relates to an electronic apparatus and a method for recognizing object and collecting image.

Presently, there are many kinds of manners of image collection. For example, when the user wants to take a photo of a certain site, he can take by using a digital camera or a camera in a mobile phone, and then transmits the picture taken in the digital camera or the mobile phone to a computer to view, print or the like. However, such method is too tedious.

SUMMARY

In view of the above situation, it would be desirable to provide an electronic apparatus and a method which can conveniently carry out the image collection.

According to one aspect of the invention, there is provided an electronic apparatus worn on a wrist of a user and having established a data connection to a remote apparatus, and the electronic apparatus includes:

A first image collecting unit for collecting an image;

A storing unit for storing the image collected by the first image collecting unit;

A gesture detecting unit for detecting a gesture of the user;

A data transmitting unit, for transmitting data with a remote apparatus;

A control unit, for activating the first image collecting unit when it determines that a first gesture of the user is detected; and activating the data transmitting unit so as to transmit the image stored in the storing unit to the remote apparatus when it determines that a second gesture of the user is detected.

Preferably, in the electronic apparatus according to an embodiment of the present invention, when it determines that the first gesture of the user is not detected, the control unit makes the first image collecting unit to be in an off-status.

Preferably, in the electronic apparatus according to an embodiment of the present invention, the gesture detecting unit includes an electromyography detecting sensor for detecting an electromyography signal of the wrist of the user so as to decide a current gesture of the user.

Preferably, in the electronic apparatus according to an embodiment of the present invention, the gesture detecting unit further includes an acceleration sensor and a gyroscope for detecting movement information and angle information of the wrist of the user so as to assist to decide the current gesture of the user.

Figure 2A:
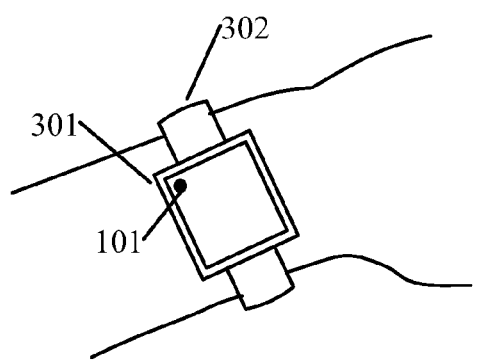
Figure 2B:
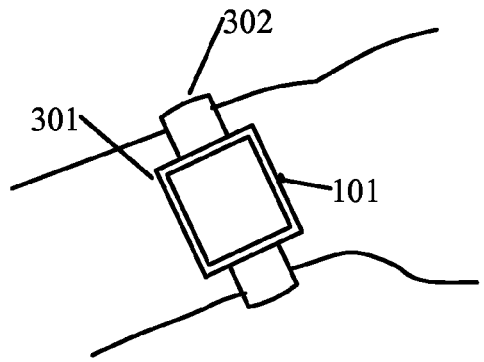
Figure 3:
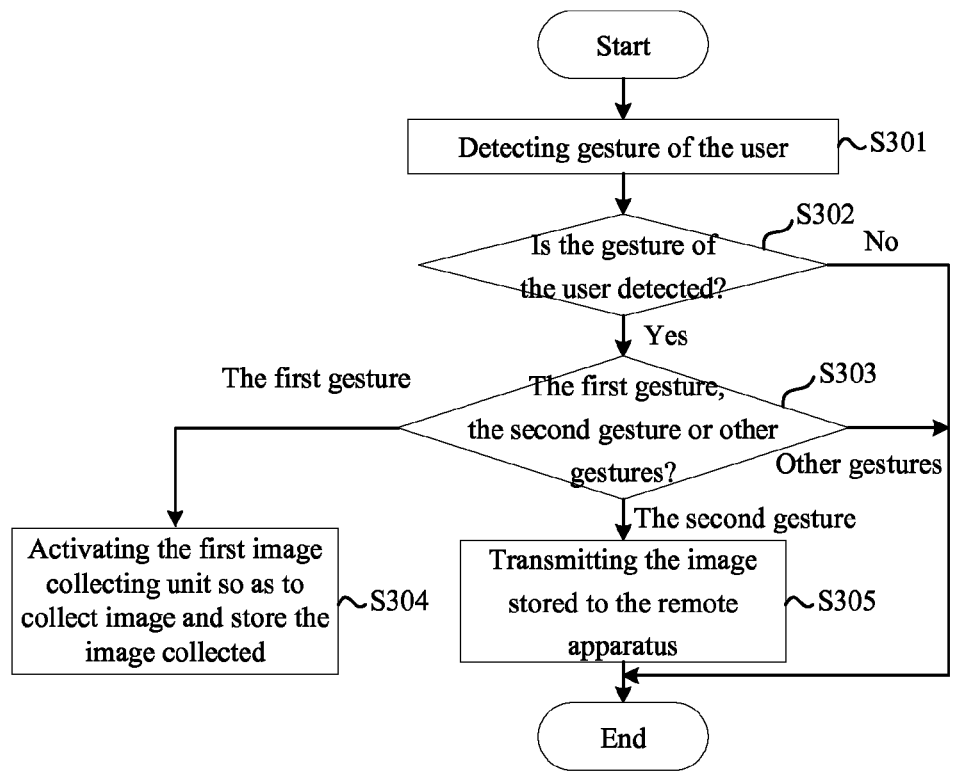

Preferably, in the electronic apparatus according to an embodiment of the present invention, the remote apparatus includes a second image collecting unit, and the hand of the user is in a field range of the second image collecting unit, and when the gesture detecting unit detects the first gesture or the second gesture, the control unit further transmit an instruction for turning on the second image collecting unit to the remote apparatus, After receiving the instruction, the second image collecting unit acquires an image of the hand of the user to further confirm whether it is the first gesture or the second gesture, FIG. 2A is a perspective view illustrating an example of the appearance of the electronic apparatus according to embodiments of the present invention;

FIG. 2B is a perspective view illustrating another example of the appearance of the electronic apparatus according to embodiments of the present invention; and FIG. 3 is a flow chart illustrating the procedure of the information processing method applied in the electronic apparatus according to an embodiment of the present invention.

DETAILED DESCRIPTION

The respective preferable embodiments of the present invention are described with reference to the accompanying drawings hereinafter. The description with reference to the accompanying drawings is provided hereinafter to help to understand the exemplified embodiment of the present invention defined by the claim or the equivalent. It comprises various kinds of specific details helping understanding, and they are only regarded as schematically. Therefore, those skilled people in the art would recognize that the embodiment described here can be made various kinds of alternation and modification without departing from the range and spirit of the present invention. Further, in order to make the specification more clear and brief, the detailed description on the well-known function and structure in the art would be omitted.

Figure 1:
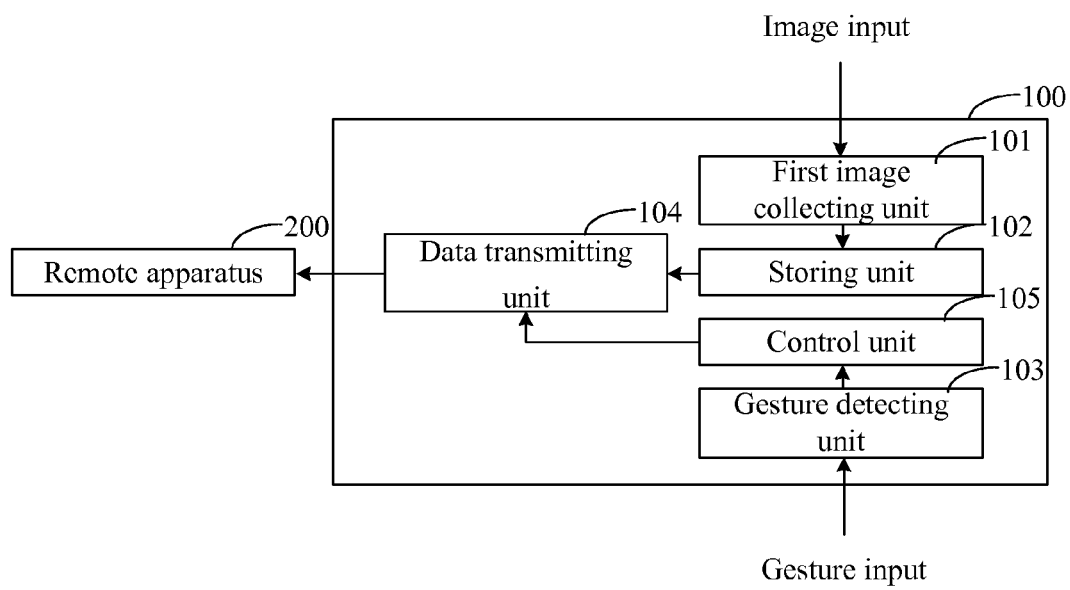
FIG. 1 is a functional block diagram illustrating the configuration of the electronic apparatus according to an embodiment of the present invention.

Firstly, the electronic apparatus according to an embodiment of the present invention is described with reference to FIG. 1. FIG. 1 is a functional block diagram illustrating the configuration of the electronic apparatus according to an embodiment of the present invention. The electronic apparatus 100 establishes a data connection to a remote apparatus 200 (for example, wireless connection or the like). For example, the electronic apparatus 100 can be an apparatus in a wristlet form.

As shown in FIG. 1, the electronic apparatus 100 includes a first image collecting unit 101, a storing unit 102, a gesture detecting unit 103, a data transmitting unit 104 and a control unit 105.

The first image collecting unit 101 has a function of collecting image. For example, the first image collecting unit 101 is a two-dimensional camera.

FIGS. 2A to 2B are perspective views illustrating examples of appearance of the electronic apparatus according to an embodiment of the present invention. As shown in FIGS. 2A and 2B, the body 301 of the electronic apparatus is connected to a wristlet 302, and is worn on the user's body (for example, hand) through the wristlet 302.

FIG. 2A illustrates a first example of the appearance of the electronic apparatus according to an embodiment of the present invention. In case of the first example, the first image collecting unit 101 in the above description can be positioned on a front surface of the body 301.

FIG. 2B illustrates a second example of the appearance of the electronic apparatus according to an embodiment of the present invention. In case of the second example, the first image collecting unit 101 in the above description can be positioned on a side surface of the body 301.

Of course, as another example, there can be two first image collecting units 101, one of them is on the front surface and the other one is on the side surface. Using which image collecting unit 101 is switched through a switching device by the user according to practical instance.

Back to FIG. 1, after the first image collecting unit 101 collects the image, the image is stored in the storing unit 102.

The gesture detecting unit 103 is used to detect the gesture of the user and determining type of the gesture. Two types of the gesture are preset as described as follows. The first gesture is a gesture for image collection, for example, the first gesture can be a gesture in which five fingertips focus on one point. The second gesture is a gesture for image transmission, for example, the second gesture is a gesture in which the five fingers outstretch. The gesture detecting unit 103 can decide whether the gesture detected is the first gesture or the second gesture or other gesture than the first gesture and the second gesture.

For example, the gesture detecting unit 103 may include an electromyography detecting sensor for detecting an electromyography signal of the wrist of the user so as to decide current gesture of the user. Of course, the electromyography detecting sensor mentioned here is just an example, and the present invention is not limited thereto. Any other sensors which can detect specific gestures are possible.

However, in view of the limited accuracy of detecting the gesture by the electromyography detecting sensor, as a more preferable embodiment, the gesture detecting unit 103 can further include an acceleration sensor and a gyroscope for detecting movement information and angle information of the wrist of the user so as to assist to decide the current gesture of the user.

Also for example, as another implementation mode of the gesture detecting unit 103, a gravity sensor (G-sensor) can be adopted instead of the electromyography detecting sensor in the above description. The G-sensor can sense a change of an accelerating force. The accelerating force is a force acting on an object in the procedure of acceleration of the object, and various kind of changes of the movement such as shake, fall, raise, drop can be converted into electrical signal by the G-sensor, and then a function designed by the program can be implemented after the calculation and analysis of the microprocessor. For example, the first gesture in the above description may be swinging hand downwards. When the user swings hand downwards, as explained in the following, the control unit 105 controls the first image collecting unit to collect image. Alternatively, the second gesture in the above description may also be swinging hand downwards. When the user swings hand downwards after completing taking photo, as explained in the following, the control unit 105 controls the data transmitting unit to transmit the picture shot.

The data transmitting unit 104 is used to transmit data with the remote apparatus.

The control unit 105 is for the following control, so as to activate the first image collecting unit to collect image when it determines that the first gesture of the user is detected; and activate the data transmitting unit so as to transmit the image stored in the storing unit to the remote apparatus when it determines that a second gesture of the user is detected.

It needs to note that the manners of the storing unit storing the image collected are various. For example, the storing unit can only store a piece of photo shot lately, or can store all of the photo shot. Further, when the data transmitting unit is activated so as to transmit the image stored in the storing unit to the remote apparatus, only the one or several photo shot lately and stored in the storing unit can be transmitted to the remote apparatus, or all of the photo stored in the storing unit can be transmitted to the remote apparatus. These settings, as mentioned above, can be selected by the user according to their own preference. Of course, these settings as mentioned above are only examples, and the present invention is not limited thereto. Those skilled in the art can understand that any other manners are possible.

And the first gesture and the second gesture may not correspond to each other in a one to one way. For example, in certain cases, the user may want to make multiple shots, and then make transmission once.

Further, take consideration of reducing the power consumption, as a more preferable embodiment, when it determines that the first gesture of the user is not detected, the control unit make the first image collecting unit to be in an off-status.

Further, take consideration of further increasing accuracy of detection of gesture to avoid erroneous judgment, as a more preferable embodiment, the remote apparatus 200 can include a second image collecting unit 201. For example, the second image collecting unit here may also be a two-dimensional camera. And, the hand of the user is in a field range of the second image collecting unit.

When the gesture detecting unit 103 detects the first gesture or the second gesture, it does not determine that the first gesture or the second gesture is detected at this time, and the control unit further transmits instruction for turning on the second image collecting unit to the remote apparatus.

After the remote apparatus 200 receives the instruction, the second image collecting unit 201 acquires an image of the hand of the user to further confirm whether it is the first gesture or the second gesture, and transmits information indicating result of confirmation back to the electronic apparatus 100.

The control unit 105 determines that the first gesture or the second gesture of the user is detected only when the data transmitting unit 104 receives information of confirming the first gesture or the second gesture from the remote apparatus 200.

Since the second image collecting unit such as the two-dimensional camera in the remote apparatus 200 can detect the gesture more accurately as compared to the gesture detecting unit such as the electromyography detecting sensor in the electronic apparatus, by using the second image collecting unit in the remote apparatus 200 as an auxiliary apparatus for detecting and determining the gesture, the accuracy of the detection can be further increased so as to avoid erroneous judgment.

Hereinbefore, the specific configuration of the electronic apparatus according to an embodiment of the present invention is described with reference to FIG. 1 and FIGS. 2A and 2B. Next, the procedure of the information processing method according to an embodiment of the present invention will be described with reference to FIG. 3. The information processing method is applied in the above electronic apparatus as shown in FIG. 1.

As shown in FIG. 3, the method includes the following step:

Firstly, in step S301, the gesture of the user is detected. As above mentioned, for example, the step of detecting the gesture of the user includes: detecting electromyography signal of the wrist of the user so as to decide the current gesture of the user. And in view of the limited accuracy of detecting the gesture by the electromyography detecting sensor, as a more preferable embodiment, the step of detecting the gesture of the user further includes detecting movement information and angle information of the wrist of the user so as to assist to decide the current gesture of the user.

And then, in step S302, whether the gesture of the user is detected is decided.

The processing ends if it is determined that the gesture of the user is not detected in step S302. On the other hand, if it is determined that the gesture of the user is detected in step S302, then the processing proceeds to step S303.

In step S303, type of the gesture of the user, that is, the first gesture, the second gesture or other gestures is determined.

When it determines that the first gesture of the user is detected in step S303, the processing proceeds to step S304. In step S304, the first image collecting unit is activated so as to collect an image and store the image collected.

On the other hand, when it determines that the second gesture of the user is detected in step S303, the processing proceeds to step S305. In step S305, the stored image is transmitted to the remote apparatus.

In another aspect, when it is determined that another gesture than the first gesture and the second gesture is detected in step S303, the processing ends.

As mentioned above, in view of reducing the power consumption, when it determines that the first gesture of the user is not detected, the first image collecting unit is made to be in the off-status.

Further, as mentioned above, in view of further increasing accuracy of the detection of the gesture to avoid erroneous judgment, as a more preferable embodiment, the remote apparatus includes a second image collecting unit, and the hand of the user is in the field range of the second image collecting unit. In this case, the above-described step S303 further includes:

transmitting an instruction for turning on the second image collecting unit to the remote apparatus when the gesture detecting unit detects the first gesture or the second gesture, wherein, after receiving the instruction, the second image collecting unit acquires an image of the hand of the user to further confirm whether it is the first gesture or the second gesture and transmit the information indicating result of confirmation back to image processing apparatus; and determining that the first gesture or the second gesture of the user is detected only when information of confirming the first gesture or the second gesture is received from the remote apparatus.

Since the information processing method according to an embodiment of the present invention is completely corresponding to the electronic apparatus according to an embodiment of the present invention in the above description, the concrete details thereof are not described extendedly in order for the conciseness of the specification.

Heretofore, the electronic apparatus and method applied thereto according to an embodiment of the present invention are already described detailed with reference to FIG. 1 to FIG. 3. With such electronic apparatus and method, it is possible for a user to perform the operations of image collection and image transmission more rapidly and conveniently.

It needs to explain that, in the specification, terms "comprise", "include" and any other variation thereof intends to cover nonexclusive inclusion so that the procedure, the method, the product or the equipment including a series of elements not only includes these elements, but also includes other elements which are not listed explicitly, or also include inherent elements of these procedure, method, product or equipment. In case that there is no more limitation, the element defined by statement "including one . . . " does not exclude there is additional same element in the procedure, method, article or apparatus including the element.

Finally, it should note that, the above-described a series of processing does not only comprise processing executed chronologically in order mentioned here, and also comprises processing executed paralleled or individually but not chronologically.

With the description of the above implementation mode, those skilled in the art can clearly understand that the present invention can be implemented by means of software plus necessary software platform, and of course, it can be implemented by software totally. Based on such understanding, the technical solution of the present invention essentially or the part contributed to the description of the prior art can be embodied by a form of a software product, the computer software product can be stored in a storage medium, such as ROM/RAM, magnetic disc, optical disk or the like, it comprises some instructions to cause a computer equipment (it may be a personal computer, a server or a network equipment or the like) to execute the method according to the respective embodiments of a certain part of the embodiment of the present invention.

The present invention is described detailed above, the principle and implementation mode of the present invention is explained by applying some specific example in the specification, the above explanation of the embodiments is only for helping to understand the method of the present invention and the essential spirit thereof, and, at the same time, for those skilled in the art, they can modify the specific implementation mode and application area based on the idea of the present invention, thus, in summary, the content of this specification should not be understood as a limitation to the present invention.

The invention claimed is:

1. An electronic apparatus having a body connected to a wristlet that is configured to be attached to a user, and the electronic apparatus having established a data connection to a remote apparatus, wherein the electronic apparatus includes:
   a first camera for collecting an image;
   a memory for storing the image collected by the first camera;
   a sensor for detecting a gesture of the user;
   a transmitting circuit for transmitting data with the remote apparatus; and
   a processor for activating the first camera to collect the image and store the collected image when it determines that a first gesture of the user is detected; and activating the transmitting circuit so as to transmit the image stored in the memory to the remote apparatus when it determines that a second gesture of the user is detected by the sensor in the electronic apparatus,
   wherein the remote apparatus includes a second camera and the hand of the user is in a field range of the second camera, and
   the second camera acquires an image of the hand of the user to further confirm whether it is the second gesture, and transmits information for indicating result of confirmation back to the electronic apparatus,
   only when information of confirming the second gesture is received from the remote apparatus, the processor determines that the second gesture of the user is detected based on the confirming of the remote apparatus and the detecting by the sensor in the electronic apparatus, wherein the sensor includes an electromyography detecting sensor or a gravity sensor.

2. The image processing apparatus according to claim 1, wherein when the first gesture of the user is not detected the processor makes the first camera to be in an off-status.

3. The image processing apparatus according to claim 1, wherein the electromyography detecting sensor detects an electromyography signal of the wrist of the user so as to decide a current gesture of the user.

4. The image processing apparatus according to claim 3, wherein the sensor further includes an acceleration sensor and a gyroscope for detecting movement information and angle information of the wrist of the user so as to assist in deciding the current gesture of the user.

5. The image processing apparatus according to claim 1, wherein
   when the sensor detects the first gesture or the second gesture, the processor transmits an instruction for turning on the second camera to the remote apparatus,
   after receiving the instruction, the second camera acquires an image of the hand of the user to further confirm whether it is the first gesture or the second gesture, and transmits information for indicating result of confirmation back to the electronic apparatus,
   the processor determines that the first gesture or the second gesture of the user is detected only when information of confirming the first gesture or the second gesture is received from the remote apparatus.

6. The image processing apparatus according to claim 1, wherein the first camera is at front surface and/or side surface of the body.

7. An information processing method applied in an electronic apparatus having a body connected to a wristlet and including a first camera and having established a data connection to a remote apparatus, wherein the method comprises:
   detecting a gesture of the user by a sensor;
   activating the first camera to collect an image and store the collected image when it is determined that a first gesture of the user is detected; and
   transmitting the image stored to the remote apparatus when it is determined that a second gesture of the user is detected by the sensor in the electronic apparatus,
   wherein the remote apparatus includes a second camera and the hand of the user is in a field range of the second camera, and
   the step of detecting the gesture of the user further includes:
   the second camera acquires an image of the hand of the user to further confirm whether it is the second gesture and transmits information indicating result of confirmation back to the electronic apparatus; and
   only when information of confirming the second gesture is received from the remote apparatus, the processor determining that the second gesture of the user is detected basing on the confirming of the remote apparatus and the detecting of the sensor in the electronic apparatus, wherein the sensor includes an electromyography detecting sensor or a gravity sensor.

8. The method according to claim 7, wherein when it is determined that the first gesture of the user is not detected, the first camera is made to be in an off-status.

9. The method according to claim 7, wherein the step of detecting the gesture of the user includes detecting an electromyography signal of the wrist of the user to decide a current gesture of the user.

10. The method according to claim 9, wherein the step of detecting the gesture of the user further includes detecting movement information and angle information of the wrist of the user to assist to decide the current gesture of the user.

11. The method according to claim 7, wherein the step of detecting the gesture of the user further includes:
   transmitting an instruction for turning on the second camera to the remote apparatus when the sensor detects the first gesture or the second gesture, wherein, after receiving the instruction, the second camera acquires an image of the hand of the user to further confirm whether it is the first gesture or the second gesture and transmits information indicating result of confirmation back to the electronic apparatus; and determining that the first gesture or the second gesture of the user is detected only when information of confirming the first gesture or the second gesture is received from the remote apparatus.

12. The method according to claim 1, wherein the second gesture is a swinging hand downward and when the user swings the hand downward, the processor activates the transmitting circuit to transmit the image stored in the memory to the remote apparatus.

* * * * *